United States Patent [19]

Balko

[11] Patent Number: 6,009,742
[45] Date of Patent: Jan. 4, 2000

[54] MULTI-CHANNEL PELLISTOR TYPE EMISSION SENSOR

[75] Inventor: Edward N. Balko, Middletown, N.J.

[73] Assignee: Engelhard Corporation, Iselin, N.J.

[21] Appl. No.: 08/970,940

[22] Filed: Nov. 14, 1997

[51] Int. Cl.[7] .................................................. G01M 15/00
[52] U.S. Cl. ........................................... 73/23.31; 60/276
[58] Field of Search .................... 73/23.31, 23.32; 60/276, 277, 272

[56] References Cited

U.S. PATENT DOCUMENTS

| | | | |
|---|---|---|---|
| 4,036,592 | 7/1977 | Brown et al. | 23/232 |
| 4,329,874 | 5/1982 | Maeda | 73/190 |
| 4,416,911 | 11/1983 | Wilkinson-Tough | 427/12 |
| 5,057,483 | 10/1991 | Chung-Zong | 502/304 |
| 5,265,417 | 11/1993 | Visser et al. | 60/274 |
| 5,444,974 | 8/1995 | Beck et al. | 60/274 |
| 5,476,001 | 12/1995 | Hoetzel et al. | 73/23.31 |
| 5,505,837 | 4/1996 | Friese et al. | 204/425 |
| 5,670,949 | 9/1997 | Kirby et al. | 73/23.31 |
| 5,698,771 | 12/1997 | Shields et al. | 73/23.31 |
| 5,889,196 | 3/1999 | Ueno et al. | 73/23.31 |

FOREIGN PATENT DOCUMENTS

| | | | |
|---|---|---|---|
| WO 95/00235 | 1/1995 | WIPO | B01D 53/36 |
| WO 96/17671 | 6/1996 | WIPO | B01D 53/94 |

OTHER PUBLICATIONS

Chen et al., "A Thick–Film Calorimetric Sensor For Monitoring The Concentration of Combustiblbe Gases", Sensors and Actuators, 19 (1989) pp. 237–248.

*Primary Examiner*—Eric S. McCall
*Attorney, Agent, or Firm*—Richard A. Negin

[57] ABSTRACT

A calorimetric sensor for sensing hydrocarbon emissions in an exhaust gas emission monitoring system is provided with at least first and second areas coated with different first and second catalysts so that one catalyst coated area produces oxidation with HC, CO and $H_2$ and the other catalyst produces oxidation with CO and $H_2$ but not with HC. Temperature increases attributed to the oxidation reactions are sensed by first and second RTDs while the temperature of an uncatalyzed sensor area is sensed by a reference RTD. Thermal temperature signals for each first and second RTD is balanced against the reference RTD signal to produce accurate first and second temperature signals which are then subtracted to produce a true signal of the HC concentration in the exhaust gas.

30 Claims, 4 Drawing Sheets

MULTI-CHANNEL PELLISTOR TYPE EMISSION SENSOR

This invention relates generally to an emissions controlled exhaust system for a vehicle equipped with an internal combustion engine and more particularly to an emissions sensor for use in such exhaust system.

The invention is particularly applicable to a sensor of the calorimetric type which is capable of sensing the hydrocarbon content of the exhaust gas and will be described with specific reference thereto. However, those skilled in the art will recognize that the invention has broader application in that the sensor of the present invention has to ability to detect any specific combustible or gaseous compound in a gas stream either individually or collectively.

BACKGROUND OF THE INVENTION

As is well known, government regulations require vehicles equipped with internal combustion engines to have emission monitoring systems conventionally known as OBD (On-board Diagnostic Systems) to advise the operator of the vehicle when the gaseous pollutants or emissions produced by such vehicles exceed government regulatory standards. Government regulatory standards set emission threshold levels which the vehicle cannot exceed when operated pursuant to a specific driving cycle such as that set forth in a FTP (Federal Test Procedure). The FTP requires that the vehicle be operated at various acceleration/deceleration modes as well as at steady state conditions.

One of the principal components of the vehicle's emission system is the catalytic converter, typically a TWC (Three Way Catalyst—$NO_x$, HC, CO). TWCs store oxygen when the engine operates lean and release stored oxygen when the engine operates rich to combust gaseous pollutants such as hydrocarbons or carbon monoxide. As the catalyst ages, its ability to store oxygen diminishes and thus the efficiency of the catalytic converter decreases. Currently, the diagnostic criterion mandated by legislation for determining the state of the catalytic converter is the efficiency at which the catalytic converter destroys hydrocarbons in exhaust gas. Catalytic converter failure is defined under current regulations as occurring when the hydrocarbon emissions level exceeds 175% of the maximum emissions level permitted for that vehicle when it was new.

There is currently no low-cost, reliable sensor for determining the hydrocarbon concentrations in the automotive exhaust gas streams. Conventional monitoring systems typically used by the automotive vehicle manufacturers today include the placement of an EGO (Exhaust Gas Oxygen) sensor either within or downstream of the TWC to sense the oxygen content of the exhaust gas after it leaves the catalytic converter. The signals generated by the downstream EGO are compared with the signals generated from an EGO positioned well upstream of the TWC and typically used to sense oxygen content readings in the exhaust gas for adjusting the air/fuel ratio content of the vehicle's engine. The upstream and downstream EGO signals are adjusted for the time it takes the exhaust gas to travel from the upstream EGO to the downstream EGO and the adjusted EGO signals are then compared to ascertain the storage capacity of the TWC when the engine is in either a lean or stoichiometric operating mode. It is now generally acknowledged that such systems provide "rough" or "crude" estimates of catalytic converter efficiencies which, in turn, have to be correlated to the regulated hydrocarbon emissions. Importantly, it is generally considered that EGO based monitoring systems will become increasingly unsatisfactory as legislation (state, federal and European) decreases the allowable vehicle emissions such as those now required or contemplated under LEV (Low Emission Values) and ULEV (Ultra Low Emission Values) requirements.

Alternative systems now under development to meet LEV and ULEV requirements are considering the use of "calorimetric" or "pellistor" type hydrocarbon sensors in place of EGO sensors. The present invention relates to such systems.

Reference can be had to U.S. Pat. Nos. 4,036,592; 4,416,911; and 4,329,874, incorporated by reference herein, for description of the principles used in calorimetric sensors to determine the presence of certain gaseous compounds in a gas mixture, calorific content of fuel gas, etc. Briefly, calorimetric or pellistor type sensors are combustible gas sensing devices which operate by catalyzing an exterior surface of a temperature measuring element such as a thermocouple or a resistance thermometer. The combustible gas, at reaction temperature, diffuses to the catalyst where it is oxidized and in the course of oxidation, liberates heat, i.e., principally an exothermic reaction. The temperature sensing element detects the resultant temperature rise and provides a varying signal which is proportional to the temperature rise and in turn correlated to the concentration of the combustible gas in the gas mixture.

It is common in the design of todays' pellistor sensors to use electrical heaters so that the pellistor can operate above ambient temperature. It is known to employ a pair of sensing elements, one catalyzed to generate a sensing signal and the other not catalyzed to generate a reference signal. The difference in signals between the two sensing elements is then a measure of the combustible gas concentration. This measuring technique is discussed and validated by Chen et al., *Sensors and Actuators*, (1989) p. 237–248 incorporated by reference herein. It is also known to use an electrochemical cell to function as an oxygen source to insure the presence of sufficient oxygen to generate combustible mixtures when the engine is operating rich. Reference can be had to U.S. Pat. Nos. 5,476,001 and 5,505,837, incorporated by reference herein, for exemplary descriptions of such sensors.

Reference should also be had to U.S. Pat. Nos. 5,444,974 and 5,265,417 which describe specially developed calorimetric or pellistor type sensors used as hydrocarbon sensors in emission systems which monitor catalytic converter efficiencies.

Now, it is to be appreciated that within the vehicle's exhaust stream, the concentrations of carbon monoxide and hydrogen (combined) are about ten times as great as the hydrocarbon concentration. Typical gas concentrations for an internal combustion engine operating under closed loop control are about 750–1000 ppm (on a Cl basis) hydrocarbons and about 0.8% carbon monoxide. With the LEV and ULEV requirement stemming from OBD-II regulations requiring detection of small amounts of hydrocarbons (on a ppm basis) it becomes increasingly difficult to ascertain which combustible in the exhaust stream sensed by a conventional pellistor constitutes the regulated hydrocarbon emission. In this connection, attempts to statistically extrapolate the hydrocarbon concentration from the total combustibles sensed by the pellistor are simply that, an extrapolation which is inherently flawed due to inabilities to control variable parameters such as temperature ranges of the exhaust gas. Similarly, attempts to control the temperature of the exhaust gas so that temperature differentiations can be utilized to sense only specific combustible type reactions, while acceptable in theory, are simply not practical to implement in an automotive vehicle. For example, while heaters are conventionally provided to maintain a lower reaction temperature, there is no control of the upper temperature range.

Accordingly, a co-pending patent application of the inventor provides a solution to this problem by enabling a pellistor sensor to determine hydrocarbon concentrations in the presence of large quantities of carbon monoxide. This is accomplished by using a pair of temperature sensing elements within the sensor with each sensing element bearing a different oxidation catalyst. One temperature sensing element is coated with a catalyst having a high activity for oxidation of all the combustible gases present in the gaseous exhaust stream, i.e., CO, hydrogen, hydrocarbons. The second temperature sensing element in the sensor is coated with a catalyst which is efficient for oxidation of carbon monoxide and hydrogen but is not active for oxidation of hydrocarbons. By subtracting the differences in the temperatures recorded between the first and second temperature sensing elements, a temperature differential can be quantified and that differential is proportional to the concentration of the hydrocarbon gases within the exhaust gas. The concept is technically sound and provides, in theory, an efficient method and apparatus for accurately determining the hydrocarbon concentration in an exhaust gas stream.

In practice, reliable correlation to hydrocarbon concentrations have not occurred principally because of thermal mismatches between the first and second temperature sensing elements. That is, the thermal readings for each catalyzed sensing element do not retain their predicted proportionality to one another. They are thermally "mismatched". A number of reasons can be attributed to the thermal mismatch including but not necessarily limited to differences in the size of the screen printed catalyst areas, misalignment of the catalyst coated areas, differences in thermal coupling within the sensor itself, etc. In theory, it is possible to correct for the thermal mismatch on a sensor by sensor basis through calibration using various gases of known combustible make-up. This is not commercially viable. More significantly, even if calibrated into a thermal match, drift over time will not be uniform for both catalysts and thermal mismatch will again occur.

SUMMARY OF THE INVENTION

Accordingly, it is a principal object of the invention to provide a highly sensitive sensor for use in an exhaust gas emission control system capable of detecting low concentrations of any combustible gaseous compound, particularly hydrocarbons, without any need to thermally match different catalytic sensing areas within the sensor.

This object along with other features of the invention is achieved in an on-board monitoring system (method and/or apparatus) for detecting gaseous emissions produced by an internal combustion engine of a vehicle which includes a catalytic converter through which the exhaust gases pass and a sensor downstream of the converter for detecting hydrocarbons present in the exhaust gas. The sensor includes at least first, second and third regions over which at least a portion of the exhaust gases pass with a first catalyst in the first region and a first sensing mechanism associated with the first region for generating first electrical signals indicative of a characteristic of the exhaust gases; a second catalyst in the second region with associated second sensing means for generating second electrical signals indicative of a characteristic of the exhaust gases and a third sensing mechanism associated with the third region for generating reference electrical signals, the third region being void of a catalyst. A balance mechanism receives the first, second and third electrical signals and generates a composite signal indicative of at least one specific gaseous component of the exhaust gases passing over the sensor whereby the temperature changes in each catalytic region are isolated and independently evaluated from one another to avoid one catalytic reaction adversely influencing the sensing of the other catalytic reaction. The system further includes a conventional on-board computer for analyzing the composite signal to determine if the vehicle complies with emission regulatory standards and a warning device activated by the computer if the emissions detected by the sensor exceed emission regulatory standards.

In accordance with the broader concepts of the invention, the sensor may have additional catalytically coated regions in excess of two with each region associated with its specific sensing mechanism to generate additional electrical signals indicative of additional exhaust gas components. In accordance with a specific feature of the invention, the gaseous components being sensed are hydrocarbons.

In accordance with a still more specific feature of the invention, the sensing mechanisms are resistance temperature devices such as platinum resistance thermometers, or alternatively, thermocouples.

In accordance with another important feature of the invention, the first catalyst region is coated with a first catalyst which is effective to cause oxidation of substantially all the combustible gases in the exhaust streams at reaction temperatures including CO, $H_2$ and HC, while the second region is coated with a second catalytic composition effective to cause oxidation principally of CO and $H_2$ and substantially ineffective to cause oxidation of HC. The balancing mechanism is effective to cause subtraction of the second electrical signal generated in the second region from the first electrical signal generated from the first region to thereby generate a composite signal indicative of the hydrocarbon concentrations.

In accordance with a specific but important feature of the invention, the balancing mechanism may include, but is not limited to, somewhat conventional bridge circuits in which one leg of the bridge has a leg indicative of the resistance of one of the first and second thermometers and another leg in the bridge or another bridge circuit leg has a resistance indicative of the resistance of the third reference thermometer. Importantly, and irrespective of circuit type, the temperature rise of each catalytic area is summed or compared to the reference signal to produce a true thermal signal indicative of the gas concentrations reacting with the catalytic area. The true thermal signals may then be combined in any manner to produce the desired sensed gas component (subtraction of the second from the first to produce hydrocarbon concentration) whereby the sensor, once calibrated, consistently produces true thermal signals over any temperature range and to some extent, is self correcting for drift.

Accordingly, it is a general object of the invention to provide a sensor which is capable of generating signals indicative of concentrations of the components of a gaseous mixture passing over the sensor.

It is another object of the invention to provide a calorimetric or a pellistor type sensor capable of sensing hydrocarbon concentrations in the exhaust gas mixture resulting from the internal combustion engine of a vehicle.

It is yet another object of the invention to provide a sensor capable of analyzing minute concentrations of combustible gases within a gas mixture in a consistent, repeatable and reliable manner.

It is still another object of the invention to provide an exhaust gas hydrocarbon sensor which can be easily implemented into conventional calorimetric or pellistor type sensor designs without significantly increasing the cost of the sensor.

It is still yet another object of the invention to provide a hydrocarbon sensor which either enhances or expands the ability of on-board monitoring systems (including on-board monitoring systems having diagnostic and/or engine control features) to determine whether or not the vehicle, during its operation, complies with emission regulatory standards.

It is still yet another specific object of the invention to provide a hydrocarbon sensor so that on-board monitoring systems can accurately determine if a vehicle complies with stringent emission regulatory standards such as LEV and ULEV emission requirements.

Yet another specific object of the invention is to provide a calorimetric sensor capable of detecting the concentrations of specific combustible gases in a gas mixture which can be easily calibrated.

Still another specific object of the invention is to provide a calorimetric sensor capable of detecting specific concentrations of combustible gases within a gas mixture which automatically adjusts for drift and/or easily adjusted for drift by electrical gain control.

A somewhat subtle, but important, object of the invention is the provision of a hydrocarbon sensor is an on-board monitoring system which also monitors the performance of a close coupled catalyst connector upstream of the conventional three way catalyst so that the vehicle can be equipped with dual or multiple catalytic converter to comply with stringent emission regulatory standards.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and an arrangement of certain parts taken together and in conjunction with the attached drawings which form part of the invention and wherein.

DETAILED DESCRIPTION

Figure 1:
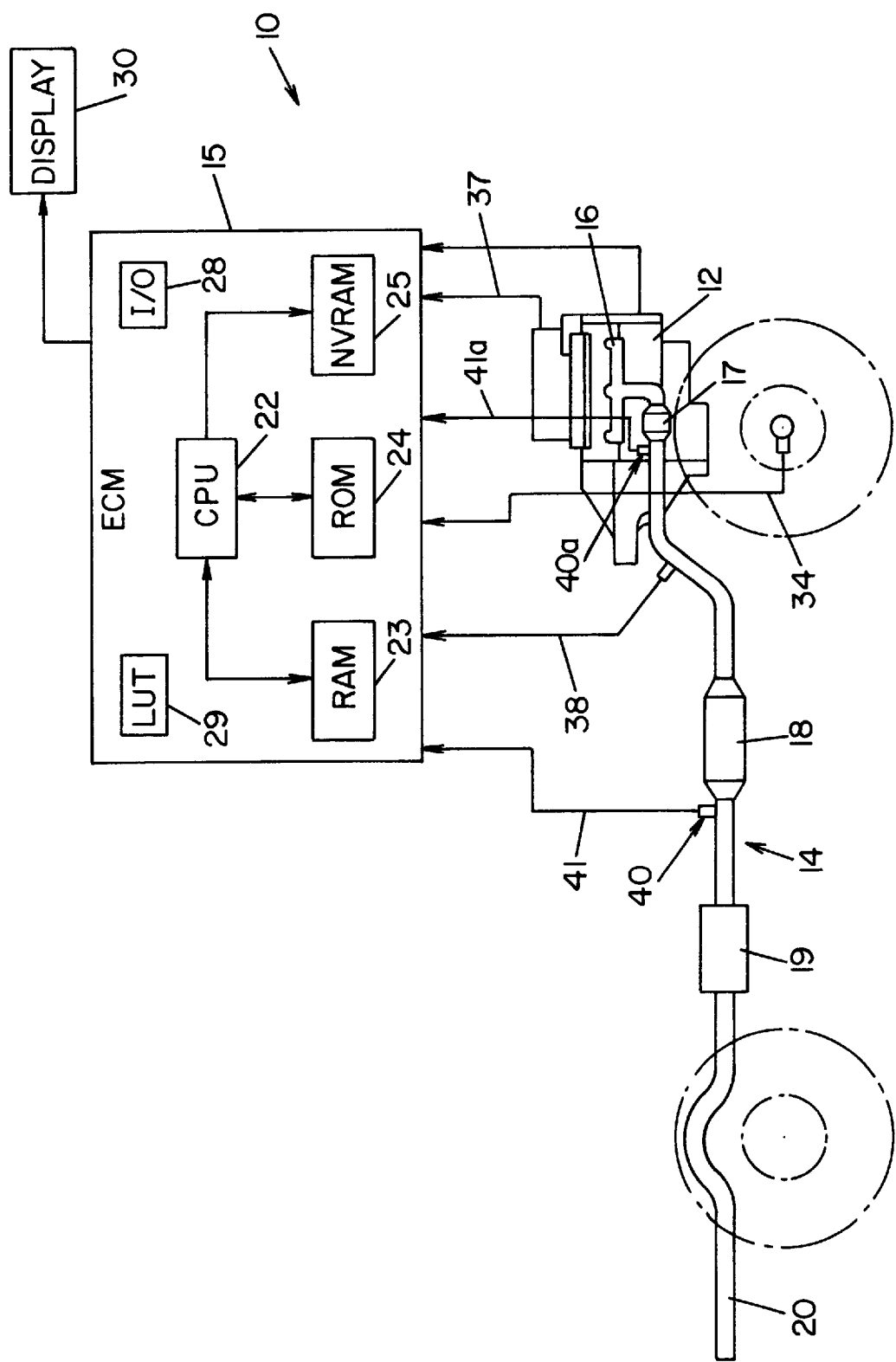
FIG. 1 is a schematic illustration of an emission control system for a vehicle equipped with an internal combustion engine.

Referring now to the drawings wherein the showings are for the purpose of illustrating a preferred embodiment invention only and not for the purpose of limiting same, there is generally shown in diagrammatic form in FIG. 1 the principal components of a vehicular emission control system 10.

I

The Emission Sensor

The vehicle has an internal combustion engine 12 which discharges gaseous pollutants or emissions through an exhaust system 14. Internal combustion engine 12 is conventionally under the control of an electronic control module or ECM 15 (controller or computer).

Exhaust system 14 is conventional and includes an exhaust header 16, a close-coupled or light-off catalyst 17 closely adjacent header 16, a three-way catalyst or TWC 18 positioned downstream of exhaust header 16, a muffler 19 downstream of TWC 18 and a tailpipe 20 downstream of muffler 19 which is open to atmosphere for discharging or emitting the emissions or gaseous pollutants produced by internal combustion engine 12.

ECM 15 is conventional and includes well known elements such as a central processing unit or CPU 22, RAM (Random Access Memory) 23, ROM (Read Only Memory) 24, and NVRAM (Non Volatile Random Access Memory) 25. Also included is a look-up table 29 separate and apart from ROM 24 (or alternatively included as a component of ROM 24). Also shown is a conventional input/output unit (I/O) unit 28 for receiving and transmitting appropriate instructions from and to ECM 15. I/O unit 28 typically transmits appropriate instructions to activate a display failure light or warning mechanism 30 situated in the vehicle. Communication between ECM 15 and transducing/actuation units on the vehicle including sensors associated therewith is typically carried out via conventional two-way communication links which may be, for example, bi-directional serial data links in 8-bit, 16-bit or 24-bit formats. ECM 15 operates in a well established known manner to control the engine and process engine control and diagnostic routines, such as that stored in step by step instructions in ROM 24. Essentially, engine operating parameters are read into ECM as input signals which are then processed into output signals or control signals outputted from ECM to actuation units on the vehicle controlling the vehicular operation, specifically, the operation of internal combustion engine 12 as well as warning mechanism 30. Insofar as the present invention is concerned, input sensor signals are read into ECM, processed by RAM 23 and NVRAM 25 under the control of CPU 22 from algorithm routines stored in ROM 24 and emission correlation data typically stored in look-up table (LUT) 29 to generate signals outputted by I/O unit 28 to display 30 and to optimally use the signals to either monitor or control engine 12.

Several sensors normally applied to the vehicle with their sensor signals inputted to ECM 15 are shown in FIG. 1. Typical sensors which generate operative signals indicative of an operating condition of the vehicle include a vehicle speed sensor generating vehicle speed signals on line 34; a plurality of sensing devices (mass air flow, EGO and manifold air pressure) schematically indicated as an A/F sensing system generating signals on line 37 estimating the ratio of air to fuel fed to engine 12 controlling combustion at or above stoichiometric ranges in engine 12; and, an EGO sensor generating signals on line 38 indicative of the oxygen present in the exhaust gas upstream of TWC 18. The only sensor added to the vehicle so that the vehicle meets OBD and OBD-II regulations is the hydrocarbon emission sensor 40 of the present invention generating emission sensor signals on line 41.

Referring still to FIG. 1, a hydrocarbon emission sensor 40 is shown positioned immediately downstream of TWC 18 and an optional second hydrocarbon emission sensor 40*a* is positioned immediately downstream of light-off catalyst 17 also generating emission sensor signals on line 41*a*. As is known to those skilled in the art, the vehicle emission control system will sample one or more operating condition sensor signals corresponding to regulatory standards dictating emission requirements of the vehicle at specified vehicle operating conditions, i.e., FTP (Federal Test Procedure). ECM 15 senses the operating conditions and then reads and interpolates emission sensor signals on lines 41, 41*a* to determine the compliance with emission standards. Further, as noted above, a number of catalytic converters can be interposed within exhaust system 14 to assure compliance with emission standards such as light-off catalyst 17, which insures catalytic hydrocarbon reactions during warmup of the vehicle while also assisting in the efficiency of TWC 18. Insofar as the present invention is concerned, correlation of the various catalytic converters during the staged combustion of the exhaust gases is monitored by hydrocarbon sensor 40 and, to some extent, the engine operation can be controlled by appropriate algorithms in response to the monitoring signals. The control algorithms for the internal combustion engine are beyond the scope of this invention. It is believed sufficient for purposes of this invention to simply note that the application for such control exists. Monitoring algorithms, on the other hand, to insure compliance with emission regulatory systems in an OBD system are well known in the art such as, for example, evidenced by U.S. Pat. Nos. 5,444,974 and 5,265,417.

As is well known, TWC 18 simultaneously catalyzes the oxidation of hydrocarbons and carbon monoxide and the reduction of nitrogen oxides in a gas stream by contacting the exhaust gas at reaction temperatures with a catalyst composition.

Such compositions typically comprise a catalytically active component. A useful and preferred component is a precious metal, preferably a platinum group metal and a support for the precious metal. Preferred supports are refractory oxides such as alumina, silica, titania, and zirconia. A catalyst system useful with the method and apparatus of the present invention comprises at least one substrate comprising a catalyst composition located thereon. The composition comprises a catalytically active material, a support and preferably an oxygen storage component.

Useful catalytically active components include at least one of palladium, platinum, rhodium, ruthenium, and iridium components, with platinum, palladium and/or rhodium preferred. Precious metals are typically used in amounts of up to 300 g/ft$^3$, preferably 5 to 250 g/ft$^3$ and more preferably 25 to 200 g/ft$^3$ depending on the metal. Amounts of materials are based on weight divided by substrate (honeycomb) volume.

Useful supports can be made of a high surface area refractory oxide support. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 60 to 300 m$^2$/g.

A useful and preferred catalyzed article can be a layered catalyst composite comprises a first (bottom) layer comprising a first layer composition and the second (top) layer comprising a second layer composition. Such articles are disclosed in WO95/00235.

Briefly, the first layer comprises a first platinum group metal component, which comprises a first palladium component, which can be the same or different than that in the second layer. In order to insure conversion of all combustibles, an oxygen storage component is used in intimate contact with the platinum group metal. It is preferred to use an alkaline earth metal component believed to act as a stabilizer, a rare earth metal selected from lanthanum and neodymium metal components which is believed to act as a promoter, and a zirconium component. The second layer comprises a second palladium component and optionally, at least one second platinum group metal component other than palladium. Preferably the second layer additionally comprises a second zirconium component, at least one second alkaline earth metal component, and at least one second rare earth metal component selected from the group consisting of lanthanum metal components and neodymium metal components. Preferably, each layer contains a zirconium component, at least one of the alkaline earth metal components and the rare earth component. Most preferably, each layer includes both at least one alkaline earth metal component and at least one rare earth component. The first layer optionally further comprises a second oxygen storage composition which comprises a second oxygen storage component. The second oxygen storage component and/or the second oxygen storage composition are preferably in bulk form and also in intimate contact with the first platinum group metal component.

When the compositions are applied as a thin coating to a monolithic carrier substrate, preferably a honeycomb carrier, the proportions of ingredients are conventionally expressed as grams of material per cubic inch of catalyst as this measure accommodates different gas flow passage cell sizes in different monolithic carrier substrates. Platinum group metal components are based on the weight of the platinum group metal.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys. Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

The discrete form and second coats of catalytic material, conventionally referred to as "washcoats", can be coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the second coat catalytic material, and dried, and the undipped downstream longitudinal segment of the carrier would then be dipped into a slurry of the first coat catalytic material and dried. Alternatively, separate carriers may be used, one carrier on which the first coat is deposited and a second carrier on which the second coat is deposited, and then the two separate carriers may be positioned within a canister or other holding device and arranged so that the exhaust gas to be treated is flowed in series first through the catalyst containing the second coat and then through the catalyst containing the first coat thereon. However, as indicated above, it is preferred to utilize a catalyst composition in which the second coat overlies and adheres to the first coat because such configuration is believed both to simplify production of the catalyst composition and to enhance its efficacy Hydrocarbon sensor 40 of the present invention is also useful in combination with a stable close-coupled catalyst, a system comprising such a close-coupled catalyst and a related method of operation as disclosed in WO96/17671 incorporated by reference herein.

Close-coupled catalysts have been designed to reduce hydrocarbon emissions from gasoline engines during cold starts. More particularly, the close-coupled catalyst is designed to reduce pollutants in automotive engine exhaust gas streams at temperatures as low as 350° C., preferably as low as 300° C. and more preferably as low as 200° C. The close-coupled catalyst of the present invention comprises a close-coupled catalyst composition which catalyzes low temperature reactions. This is indicated by the light-off temperature. The light-off temperature for a specific component is the temperature at which 50% of that component reacts.

Close-coupled catalyst 17 is placed close to engine 12 to enable it to reach reaction temperatures as soon as possible. However, during steady state operation of the engine, the proximity of the close-coupled catalyst to engine 12, typically less than one foot, more typically less than six inches and commonly attached directly to the outlet of the exhaust manifold exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine. TWC 18 downstream of the close-coupled catalyst can be an underfloor catalyst or a downstream catalyst. When TWC 18 is heated to a high enough temperature to reduce the pollutants, the reduced conversion of carbon monoxide in the close-coupled catalyst results in a cooler close-coupled catalyst 17 and enables the downstream catalyst TWC 18, typically the underfloor three-way catalyst to burn the carbon monoxide and run more effectively at a higher temperature. The downstream or underfloor catalyst preferably comprises an oxygen storage component as described above.

Close-coupled catalyst 17 preferably is in the form of a carrier supported catalyst where the carrier comprises a honeycomb type carrier. A preferred honeycomb type carrier comprises a composition having at least about 50 grams per cubic foot of palladium component, from 0.5 to 3.5 $g/in^3$ of activated alumina, and from 0.05 to 0.5 $g/in^3$ of at least one alkaline earth metal component, most preferably, strontium oxide. Where lanthanum and/or neodymium oxide are present, they are present in amounts up to 0.6 $g/in^3$.

Insofar as the present invention is concerned, it should be noted that close coupled catalyst 17 does not convert $NO_X$. Its efficiency is only monitored by sensing combustibles. Accordingly, a hydrocarbon sensor 40 positioned upstream of close coupled catalyst 17 (not shown) will provide a monitoring system for close coupled catalyst 17 as well as a monitoring system permitting evaluation of each catalytic converter in the emission system.

II

The Sensor

Figure 2:
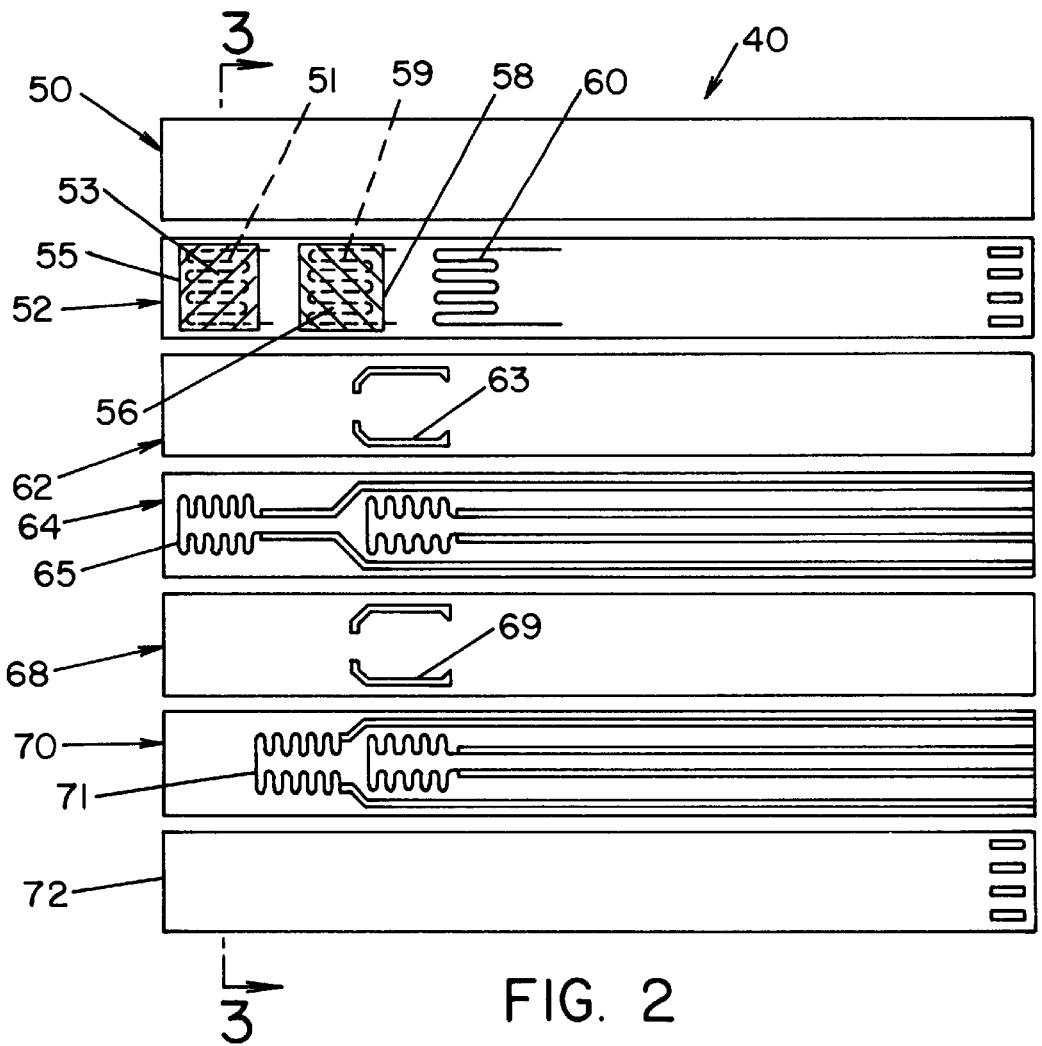
FIG. 2 is a schematic, plan view representation, of the substrate layers of a multi-layered calorimetric sensor.

Referring now to FIG. 2, calorimetric sensor 40 is essentially a plurality of ceramic layers (plan views of each being shown in overlying relationship in FIG. 2) which are laminated together to essentially form a multi-layered substrate typically inserted into a housing (not shown) for mounting into the exhaust system, typically within the catalytic converter flange catching slip streams of the exhaust gas passing through the exhaust system. More particularly, multi-layered green tape technology provides a capable and economic and thus preferred process for the production of sensor 40. Each ceramic layer (with the possible exception of the top porous layer) supports screen-printed metalization arranged in different patterns to define the various functional elements necessary to measure the heat and control temperature within gas sensor 40.

Figure 3:
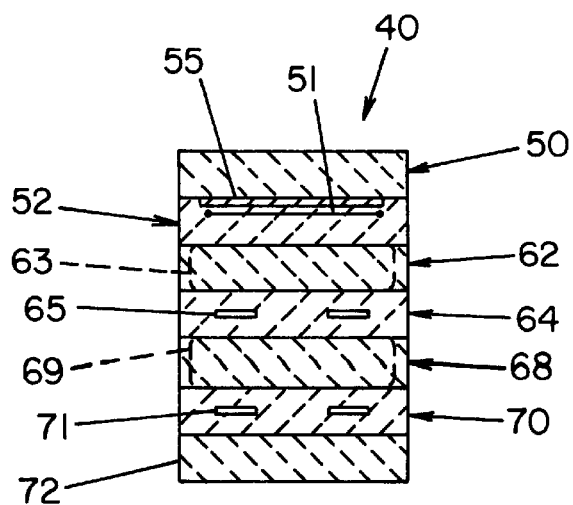
FIG. 3 is a schematic, cross-sectioned end view of the calorimetric sensor taken along lines 3—3 of FIG. 2.

The specific sensor 40 shown in FIGS. 2 and 3 is a diagrammatic of a somewhat conventional sensor with layers arranged to illustrate the invention which is not limited, per se, to any specific sensor construction. Sensor 40 includes an optional porous top ceramic layer 50 which permits exhaust gases to flow thereof and is somewhat in the nature of a protective layer. Layered below optional top layer 50 is a catalyst layer 52 which optionally could function as top layer 50. Over an area, preferably at the longitudinal end and designated by the cross hatched area 53 in FIG. 2 is a first catalyst 55 on the side of catalyst layer 52 adjacent porous top layer 50. Longitudinally spaced from but adjacent cross hatched area 53 is a second cross hatched area 58, similar in size to area 53, over which a second catalyst 56 is placed.

Positioned beneath first catalyst 55 is a temperature resistance measuring element thermistor or thermometer 51 arranged in a serpentine form to span a discrete area and having leads or electrodes preferably formed in platinum. As used herein, all resistance type temperature sensing elements such as thermometers, thermistors, etc. as well as other temperature sensing devices such as thermocouples will simply be referred to as RTD or serpentine temperature measuring device and the invention contemplates the use of any such device. However, a thermometer with platinum leads is preferred. It should be noted that first serpentine 51 spans area 53 in contact with first catalyst 55. Beneath second catalyst 56 is a second serpentine 59 spanning second crosshatched area 58. Positioned adjacent but spaced longitudinally away from second serpentine 59 is a reference serpentine 60. Reference serpentine 60 is in contact with an uncatalyzed area of catalyst layer 52.

As to the positioning of first and second catalyst 55, 56 and serpentines 51, 59, and 60, several variations from that illustrated are, of course, possible. One variation, and possibly the preferred variation, is to place second catalyst 56 on a bottom layer (not shown) at the longitudinal end of the sensor to assure uniform gas flow to both catalysts 55, 56. In such construction, the intermediate layers would be constructed to maintain heat symmetry, etc. with both catalysts. If more than two catalysts are to be employed, first area 53 can have two laterally spaced different catalysts positioned thereon and the bottom layer described with respect to the variation can also have two laterally spaced catalytic areas thus giving a total of four (4) catalyst areas for sensing various gas compositions. Lateral spacing of the catalyst is preferred over fore and aft spacing because the combustion gases will initially circulate about the end of gas sensor 40 and this provides the most accurate position to sense the gas which must diffuse to catalyst layer 52 through top layer 50. Longitudinal spacing is shown in FIG. 2 for illustration purposes.

Underlying catalyst layer 52 is a first insulating layer 62 containing a spacer 63. Beneath insulating layer 62 is a first heater layer 64 containing a first electrical resistance type heater element 65. Heater element 65 is specifically formed with serpentine heater grid portions, one of which is aligned with first serpentine 51, and another portion is aligned with reference serpentine 60. Underlying first heater layer 64 is a second insulating layer 68 containing a second spacer 69 and is similar to first insulating layer 62. Underlying second insulating layer 68 is a second heater layer 70 with a second resistance heater element 71 underlying second catalyst 56 and reference serpentine 60. First and second heater elements 65, 71 function to insure the catalyzed areas 53, 58 (as well as the uncatalyzed reference area adjacent reference serpentine 60) are at a minimum temperature sufficient to assure the desired catalytic reaction. First and second heater elements 65, 71 could be replaced by one layer for the fore and aft spacing illustrated for sensor 40 shown in FIG. 2. Closing the bottom of sensor 40 is a bottom cover 72.

The general construction of gas sensor 40 as thus described is somewhat conventional except for the positioning of first and second catalyst 55, 56 and serpentines 51, 59 and 60. Also, not shown is an optional feature of an electrochemical oxygen source which can be included into sensor 40 as a separate ceramic layer either adjacent catalyst layer 52 or formed as a separate ceramic substrate surrounding the multi-layer assembly or portions thereof shown in FIGS. 2 and 3. Reference should be had to U.S. Pat. Nos. 5,476,001 and 5,505,837 for examples of electrochemical oxygen source configurations which may be incorporated into sensor 40.

As noted in the Summary of the Invention above, the composition of first catalyst 55 is effective to sense the concentration of all combustibles, i.e., CO, HC, and $H_2$ (less methane) while the composition of second catalyst 56 is effective to sense the concentrations of only CO and $H_2$ at reaction temperatures, i.e., greater than approximately 450° C.

The catalyst composition for total combustion of hydrocarbons with the exception of methane, carbon monoxide and hydrogen comprises active metal components such as one or more of the following elements: platinum, rhodium, palladium, iridium, and ruthenium. Generally, platinum, rhodium and palladium are preferred. Combinations of platinum and rhodium are even more preferred. These active metals are preferably supported on a stable refractory support such as alumina, zirconia, titania, silica, silica alumina or other similar ceramic materials. High surface area materials such as gamma alumina are preferred. Optionally, an oxygen storage material such as ceria may be added to the catalyst formulation. However, this material is not essential for utility in a sensor where there is sufficient oxidizing agent present in the environment or where an oxidizing agent, such as air or oxygen, is provided by external means. Thus, even more preferred are refractory materials that are especially stabilized by thermal or chemical means, such as precalcined alumina and ceria stabilized zirconia, a disclosure of which is provided in U.S. Pat. No. 5,057,483 entitled "Catalyst composition containing segregated platinum and rhodium components" issued Oct. 15, 1991 to C. Z. Wan and assigned to Engelhard, the disclosure of which is expressly incorporated by reference herein.

The particle size of the catalyst should be such that a binder can be used to adhere the catalyst formulation to catalyst layer 52 of sensor 40. In addition, the particle size and uniformity of the catalyst should be such that the processes for catalyst deposition, such as screen printing, are feasible. In general, the mean particle size of the catalyst material should be less than ten microns in diameter with a more or less normal distribution about that mean. More preferred is a mean particle size of approximately 5 microns in diameter.

With respect to second catalyst 56 the reactivity towards catalytic oxidation decreases as follows—carbon monoxide (CO)>olefins>aromatics>paraffins. As a practical matter, at elevated temperatures (greater than 200° C.), the reactivity of CO and olefins towards catalytic oxidation is similar. This means that for most catalytic systems at the temperature where oxidation of CO occurs, the oxidation of hydrocarbons, particularly olefins, occurs at the same or only slightly higher temperatures than CO. In other words, the light off curves for CO and hydrocarbon (HC) are relatively close together. While there are some known selective catalysts that exhibit good low temperature (less than 200° C.) oxidation activity for CO, these catalysts are not useful for applications where higher temperatures are necessary. Moreover, these catalysts tend to be easily poisoned or lose their low temperature activity for CO oxidation after exposure to elevated temperatures.

Examples of first catalyst 55 are set forth below in examples 1–3 and examples of second catalyst 56 are set forth below as examples 4–6.

EXAMPLE 1

Platinum Rhodium Catalyst on Prestabilized Alumina 100 grams of gamma alumina is calcined in a furnace at 850° C. for thirty minutes. 50 g of the calcined alumina is then impregnated to incipient wetness with 14.4 g of an aqueous solution (18.0% Pt) of a platinum amine hydroxide salt diluted with 11 g of water. Then 1.5 milliliters of acetic acid is mixed into the impregnated alumina. The remaining 50 g of calcined alumina is impregnated with 0.2 g of rhodium nitrate solution (10.37% Rh) diluted with 20 g of water. Then 1.3 milliliters of monoethanolamine is mixed into the rhodium impregnated alumina. Both impregnated aluminas are placed into a jar mill and then enough water is added to give a slurry of about 40% solids. Grinding media is added and the slurry is milled until a median particle size of about 5 microns is obtained. The slurry is removed from the jar and the water is removed using a rotary evaporator. The remaining solids are dried at 120° C. The catalyst can be calcined at 550° C. in preparation for deposition onto a sensor.

Catalyst of this Example 1 converts substantially all hydrocarbon and carbon monoxide species above 400° C.

EXAMPLE 2

Platinum Rhodium Catalyst on Alumina Also Containing Ceria 8.64 g of an aqueous solution (10.54% Pt) of a platinum amine hydroxide salt is diluted with 15 g water. This solution is impregnated into 123.6 g of gamma alumina (calcined 850° C. or uncalcined, calcined is preferred). 3.7 ml of acetic acid is mixed into the impregnated alumina. 1.5 g of the above aqueous Pt salt solution is diluted with 26.3 g water. This diluted solution is impregnated onto 92.8 g of ceria stabilized zirconia. 2.8 ml of acetic acid is mixed into the impregnated ceria zirconia. Both impregnated supports are placed into a mill jar along with 187 ml water and grinding media. The resulting slurry is milled for 20 minutes. 18.5 g of an aqueous rhodium nitrate solution (10.08% Rh) is diluted with 43.3 g water. This solution is impregnated into 123.6 g of alumina (calcined 850° C. or uncalcined, calcined preferred). 4.5 g of monoethanola-mine is mixed into the impregnated alumina. This material is added to the mill jar containing the previously prepared slurry. The mixture is milled for approximately three (3) hours. Then 35 g of zirconium hydroxide (27.7% solids) and 2 drops of defoamer are added to the jar with an additional amount of water to thin out the slurry. The milling is continued until the medium particle size is about 5 microns. The slurry is removed from the milling jar and the water is removed using a rotary evaporator. The remaining solids are dried at 120° C. The catalyst can be calcined at 550° C. in preparation for deposition onto a sensor.

Catalyst of Example 2 converts substantially all hydrocarbon and carbon monoxide species above 400° C.

EXAMPLE 3

Rhodium on Stabilized Ceria Zirconia 10 g of ceria stabilized zirconia is impregnated with 10.8 g of an aqueous rhodium nitrate solution (10.08% Rh). The ceria zirconia has a median particle size of 1.0 micron diameter with 90% less than 3.9 microns. The impregnated solids are dried in an oven at 120° C. To the dried powder is added 4.3 g of zirconium hydroxide (37% solids). To the resulting mixture is added enough water to make a slurry of 40–50% solids. The slurry is ball milled for approximately forty-five (45) minutes. Water is removed from the slurry using a rotary evaporator. The resulting solids are dried at 120° C. The catalyst can be calcined at 550° C. in preparation for deposition onto a sensor. Catalyst of Example 3 converts substantially all hydrocarbon and carbon monoxide species above 350° C.

EXAMPLE 4

Rhodium and Bismuth

As presently preferred, second catalyst 56 includes a catalyst composition having a rhodium component and a bismuth component on a refractory oxide support. The rhodium and bismuth are combined as a solution of soluble salts, e.g., nitrates, sulfates, etc., at very low Ph so that bismuth sub-oxide does not precipitate from the solution. Alternately, any method that intimately contacts the rhodium and bismuth can be used to synthesize the catalyst. This includes but is not limited to the inclusion of materials such as fluxes and low melting frits. The atomic ratio of bismuth to rhodium can vary over a wide range but the preferred ratio is in the range of 0.5–3.0. The most preferred ratio tends to be 1.0 to 2.5 depending on the exact materials and the exact procedure used to synthesize the catalyst.

A solution of the bismuth and rhodium salts is impregnated onto a refractory support such as zirconia or ceria stabilized zirconia. Other supports are suitable in this application, but may affect the selectivity of the catalyst. For example, the selectivity of a catalyst prepared using high surface area alumina is believed to be inferior to a catalyst prepared using ceria stabilized zirconia.

Following impregnation of the refractory support with the rhodium/bismuth solution, the catalyst is dried and then calcined at a sufficiently high temperature for obtaining optimal performance. As presently preferred, calcination of the catalyst should be carried out at 850° C. for approximately ten (10) minutes. While it is likely that these time and temperature parameters can be varied significantly without affecting the performance of the COS catalyst, it is believed that calcination at a temperature less than 550° C. gives inferior results.

36.6 grams of bismuth nitrate pentahydrate is dissolved into 58.0 grams of rhodium nitrate solution (10.37% Rh). This precious metal solution is slowly added to 40.0 g ceria stabilized zirconia and stirred until incipient wetness is achieved which may not require all of the precious metal solution. This impregnated material is then dried at approximately 120° C. As needed, the previous two steps are repeated until all of the precious metal solution has been used. The impregnated material is slurried to approximately 50% solids in water. 2.4 grams of zirconium hydroxide paste (50% solids) are added to the slurry and the mixture is placed into a jar with a suitable grinding media and milled until a median particle size of approximately 5 microns is achieved. A rotary evaporator removes water from the slurry which is subsequently oven dried at 120° C. 4.0 grams of catalyst is slurried to 45% solid with water in preparation for coating onto a monolith.

This catalyst in Example 4 is very selective for carbon monoxide oxidation in the presence of hydrocarbons over a wide temperature range.

EXAMPLE 5

Rhodium Bismuth on Ceria Zirconia

A catalyst containing rhodium and bismuth on ceria zirconia is prepared in accordance to the following procedure. 6.7 grams of bismuth nitrate pentahydrate is dissolved into 10.8 grams of rhodium nitrate solution (10.8% Rh). This precious metal solution is slowly added to 20.0 g ceria stabilized zirconia and stirred until incipient wetness is achieved which may not require all of the precious metal solution. This impregnated material is then dried at approximately 120° C. As needed, the previous two steps are repeated until all of the precious metal solution has been used. The impregnated material is slurried to approximately 50% solids in water. 2.2 grams of zirconium hydroxide paste (27% solids) are added to the slurry and the mixture is placed into a jar with a suitable grinding media and milled until a median particle size of approximately 5 microns is achieved. A rotary evaporator removes water from the slurry which is subsequently oven dried at 120° C. 4.0 grams of catalyst is slurried to 45% solid with water and coated onto a monolith using the process described above. This catalyst in Example 5 is very selective for carbon monoxide oxidation in the presence of hydrocarbons. Moreover, high temperature hydrothermal aging did not deteriorate this performance.

EXAMPLE 6

Rhodium Bismuth on Zirconia

A catalyst containing rhodium and bismuth on zirconia is prepared in accordance to the following procedure. 7.6 grams of bismuth nitrate pentahydrate is dissolved into 12.8 grams of rhodium nitrate solution (9.75% Rh). This precious metal solution is slowly added to 20.0 g zirconium oxide (made by calcining zirconium hydroxide for approximately one (1) hour at 450° C.) and stirred until incipient wetness is achieved which may not require all of the precious metal solution. This impregnated material is then dried at approximately 120° C. As needed, the previous two steps are repeated until all of the precious metal solution has been used. The impregnated material is slurried to approximately 50% solids in water and placed into a jar with a suitable grinding media and milled until a median particle size of approximately 5 microns is achieved. A rotary evaporator removes water from the slurry which is subsequently oven dried at 120° C. 4.0 grams of catalyst is slurried to 45% solid with water and coated onto a monolith using the process described above.

The selectivity of this catalyst in Example 6 for carbon monoxide oxidation is similar to rhodium bismuth on ceria zirconia (Example 3). Therefore, while the inclusion of ceria may be beneficial for other reasons, it is not essential to provide a catalyst having good selectivity.

III

The Hydrocarbon Signal

Figure 4:
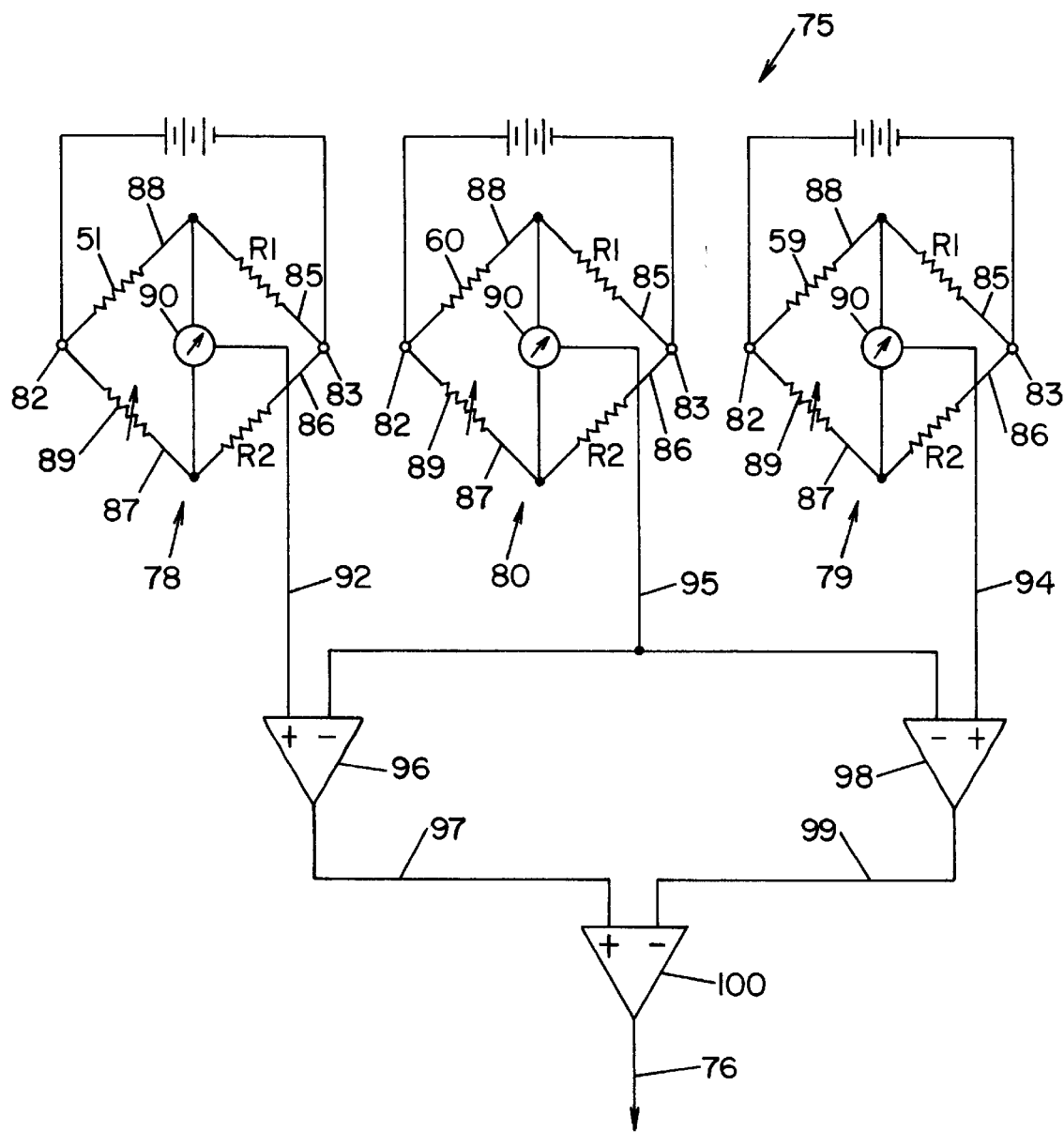
FIG. 4 is a schematic illustration of a bridge circuit used for developing the hydrocarbon concentration signal of the sensor; and, FIG. 5 is a schematic representation of an alternative bridge circuit similar to FIG. 4.

Referring now to FIG. 4, there is shown a bridge circuit 75 for generating a composite signal 76 indicative of the hydrocarbon concentration in the exhaust gas sensed by sensor 40. Bridge circuit 75 is illustrated only because it inherently shows in a clear manner the benefits of the invention. While commercial embodiments could use variations of a bridge circuit, it is to be understood that the invention is not limited to the use of bridge circuits for generating a hydrocarbon signal but contemplates any circuit, preferably analog circuits and preferably resistor based analog circuits, which measure deviations in temperatures attributed to first and second catalyst 55, 56 relative to a non-catalyzed reference signal sensing the temperature of unreacted exhaust gas to generate, by comparison or summing, a difference signal in turn correlated to the hydrocarbon concentration in the exhaust gas. All such circuits will be referred to herein as balance or balancing circuits in the sense that each temperature sensor sensing a catalytic area temperature is compared to or balanced against a reference temperature signal sensing the temperature of an uncatalyzed sensor area to generate a true or accurate signal indicative of the temperature rise attributed only to the catalytic induced reaction.

Bridge circuit 75 in turn is shown to comprise, again for explanatory purposes, three identically configured bridge circuits, 78, 79, 80. Specifically, a first bridge circuit 78 is provided for sensing the temperature rise indicated by first serpentine 51 attributed to first catalyst 55 reacting with all the combustibles in the exhaust gas, i.e., CO, HC and $H_2$. A second bridge circuit 79 is provided for determining the temperature increase attributed to the second serpentine 59 caused by second catalyst 56 reacting with combustibles CO and $H_2$. A third reference bridge circuit 80 is provided for sensing the temperature of reference serpentine 60 which in turn simply senses the temperature of the unreacted exhaust gas on catalyst layer 52.

Each bridge circuit 78, 79, 80 is identically configured so that a description of any one will likewise apply to the others. Referring to first bridge 78, and in accordance with conventional practice, a fixed voltage is applied between opposed nodes 82, 83. Fixed resistors shown as R1 and R2 are provided in bridge legs 85, 86 adjacent node 83. In one of the legs 87 adjacent node 82 is provided a variable resistor 89 while the resistance measured by first serpentine 51 is applied to the other bridge leg 88 adjacent node 82. In all three bridge circuits 78, 79, 80 R1 equals R2 and those resistances are significantly larger than the resistances developed by serpentines 51, 59, and 60. In accordance with conventional practice, the output of the bridge diagrammatically illustrated by voltage meter 90 is controlled by regulating variable resistor 89. Since temperature changes result in resistance changes in resistor 89 and as the current is constant, temperature changes are reflected in voltage changes across the bridge.

Second bridge circuit 78 has the resistance of second serpentine 59 interposed in its bridge leg 88 and reference bridge circuit 80 has the resistance of reference serpentine 60 interposed in its bridge leg 88.

Thus, first bridge circuit 78 generates a voltage output on first output signal line 92 indicative of a temperature increase attributed to the total combustibles in the exhaust gas. Similarly, second bridge circuit 79 generates an output voltage signal on second output line 94 indicative of a temperature rise attributed only to carbon monoxide and $H_2$. Reference bridge circuit 80 generates an output voltage signal on reference voltage line 95 indicative of the temperature of unreacted exhaust gas. The voltage output on first output line 92 and reference output line 95 are subtracted in a first summing amplifier 96 to generate a true output signal on line 97 indicative of the temperature rise attributed to the total combustibles in the exhaust gas sensed by sensor 40. Similarly, output voltages on second output line 94 and reference output line 95 are subtracted in a second summing amplifier 98 to generate on second output line 94 a true signal indicative of the temperature rise attributed to only carbon monoxide and HC concentrations of the exhaust gas. The true signals 97, 99 in turn are subtracted in summing amplifier 100 to generate a hydrocarbon signal indicated by reference numeral 76 which is a composite or difference signal correlated to the H concentration. Lookup table 29 can provide the correlations once composite signals 76 have been digitized.

Figure 5:
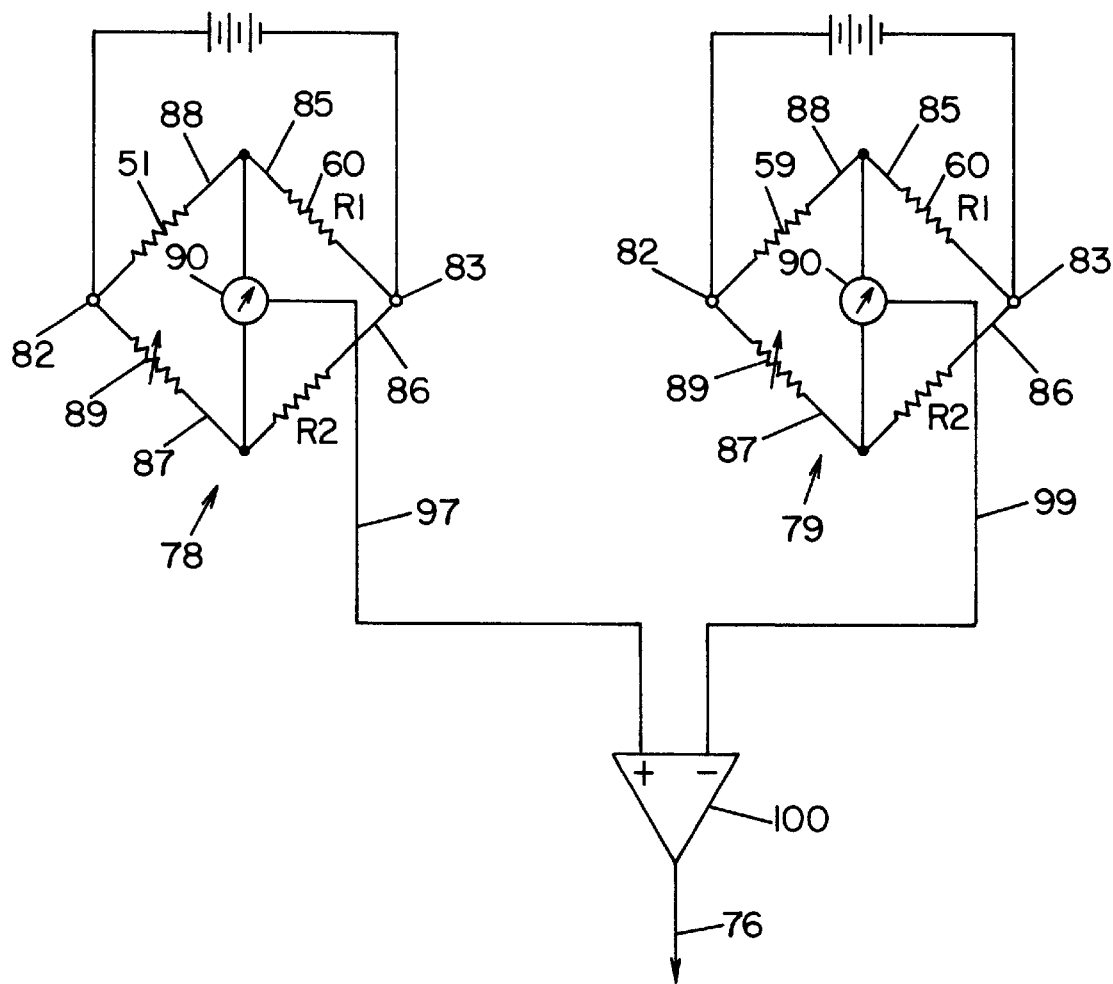

As noted, bridge circuit 75 is merely exemplary of a balance circuit and obvious modifications and alterations will occur to others skilled in the art. FIG. 5 shows such a modification and the same reference numerals used in describing FIG. 4 will apply with respect to FIG. 5. In the embodiment illustrated in FIG. 5, the referenced bridge circuit 80 is eliminated and the reference serpentine resistance 60 is applied to one of the fixed resistors so that the first and second bridge circuits 78, 79 generate true signals eliminating the need for first and second summing amplifiers 96, 98. Again, entirely different circuits may be used in lieu of the bridge circuits illustrated.

Bridge circuits have been chosen for illustration because they lend themselves to a mathematical verification of how the system works and why it represents an improvement over the prior invention discussed in the background above. The mathematical analysis is as follows:

If the response for any single pellistor serpentine in the free temperature rise system is written as:

$$V = iG\left(\Delta R_{offset} + C\Delta T_{gas} + \sum_{j=1}^{n} [\text{analyte}]_j H_j KC\right)$$

where:
i=bridge current
G=combined amplifier gain
C=Serpentine temperature coefficient of resistance, i.e., 51, 59
$\Delta R_{offset}$=Bridge imbalance at "null" temperature
$\Delta T_{gas}=T_{actual}-T_{null}$
H=Proportionality between analyte concentration and quantity of heat liberated within the catalyst
K=Serpentine temperature rise per unit heat liberated in the catalyst.

Then the difference between the signal from two serpentines is:

(first serpentine 51 less second serpentine 59)

$$V_1 - V_2 = i_1 G_1 \left(\Delta R_{offset,1} + C_1 \Delta T_{gas} + \sum [\text{analyte}]_j H_{j,1} K_1 C_1\right) -$$
$$i_2 G_2 \left(\Delta R_{offset,2} + C_2 \Delta T_{gas} + \sum [\text{analyte}]_j H_{j,2} K_2 C_2\right)$$

Collecting terms:

$$\Delta V = V_{offset} + \Delta T_{gas}(i_1 G_1 C_1 - i_2 G_2 C_2) +$$
$$\sum_{j=1}^{n} [\text{analyte}]_j (i_1 G_1 H_{j,1} K_1 C_1 - i_2 G_2 H_{j,2} K_2 C_2)$$

When the bridge currents and amplifier gains are set equal, then for a pellistor with only one channel (i.e., either 55 or 56) catalyzed, the response would be:

$$\Delta V = V'_{offset} + A(\Delta T_{gas}(C_1 - C_2) + \sum [\text{analyte}]_j H_{j,1} K_1 C_1$$

Where: A=iG

For a pellistor with one channel bearing a total combustibles catalyst (first catalyst 55) and the second channel bearing a CO selective catalyst (second catalyst 56), the response equation would be:

$$\Delta V = V'_{offset} + A(\Delta T_{gas}(C_1 - C_2) +$$
$$([CO]\{H_{CO,1}K_1C_1 - H_{CO,2}K_2C_2\}) +$$
$$\sum [\text{Hydrocarbon}]_j H_{j,1} K_1 C_1$$

or $$\Delta V = V'_{offset} + A\left(\Delta T_{gas}(C_1 - C_2) + ([CO]M) +$$
$$\sum [\text{Hydrocarbon}]_j H_{j,1} K_1 C_1$$

Where: $M = H_{CO,1}K_1C_1 - H_{CO,2}K_2C_2$

If the two serpentines are thermally perfectly matched, then M=0, the second term within the parentheses disappears, and the device responds only to hydrocarbons.

If ($H_{CO,1}K_1C_1$) and $H_{CO,2}K_2C_2$) are not equal, because of differences in the size of the screen printed catalyst areas, misalignment, or differences in thermal coupling to other parts of the device, to name just a few possible sources of mismatch, then the pellistor will also develop a signal when CO is present. It will not be possible to distinguish a CO signal arising from a mismatch from a genuine hydrocarbon signal.

If a third, uncatalyzed serpentine (i.e., reference serpentine 60) is added, then the following pair of equations obtain:

$$\Delta V_1 = V_{1,offset} + A(\Delta T_{gas}(C_1 - C_3) + \sum [\text{analyte}]_j H_{j,1} K_1 C_1)$$
$$\Delta V_2 = V_{2,offset} + A(\Delta T_{gas}(C_2 - C_3) + [CO]H_{CO,1}K_2C_2)$$

When the device is calibrated with CO, the quantity $H_{CO,1}K_2C_2$ will be obtained from $\Delta V_2$ and the quantity M obtained from $\Delta V$. Then it will be possible to determine the ambient CO concentration from $\Delta V_2$ and therefore to correct device response for CO signal mismatch and produce a reliable hydrocarbon response using:

$$\Delta C_{corr} = \Delta V - A([CO]M)$$

By incorporation of the third, uncatalyzed channel (60), the need for close matching of the thermal characteristics of the sensing channels has been greatly reduced and the sensitivity of the pellistor as a hydrocarbon sensor is correspondingly increased.

The invention has been specifically described with reference to a three-channel or serpentine calorimetric gas sensor specifically designed to ascertain the hydrocarbon content of an exhaust gas. As noted, additional catalyzed areas can be provided to detect the presence of other gases such as $NO_X$. With respect to the OBD monitoring systems described above, it is to be appreciated that calorimetric sensor 40 develops the means for directly measuring the hydrocarbon content in the exhaust gas to thus obviate the need for EGO sensors which are somewhat inadequate to sense the emissions produced by the vehicle. However, a further system benefit attributed to sensor 40 is its application in the control of internal combustion engine 12. More specifically, readings from sensor 40 can further implement the air/fuel sensor readings to better insure the lean operating condition of the engine so that hydrocarbon emissions are reduced.

The invention has been described with reference to a preferred embodiment. Obviously, modifications and alterations will suggest themselves to those skilled in the art upon reading and understanding the Detailed Description of the Invention. For example, the invention is not necessarily limited to temperature sensing. Gas flows over catalytically coated surfaces may produce reactions other than temperature increases attributed to oxidation. Simply put, if the changes are capable of being measured, the system described herein has application. It is intended to include all such modification and alterations insofar as they come within the scope of the present invention.

Having thus defined the invention, it is claimed:

1. An on-board monitoring system for detecting gaseous emissions produced by an internal combustion engine of a vehicle comprising:

a) a catalytic converter through which exhaust gases pass;

b) a sensor downstream of said converter for detecting hydrocarbons present in said exhaust gas, said sensor having i) at least first, second and third regions over which at least a portion of said exhaust gases pass;

ii) a first catalyst in said first region and first sensing means associated with said first region for generating first electrical signals indicative of a characteristic of said exhaust gases;

iii) a second catalyst in said second region and second sensing means associated with said second region for generating second electrical signals indicative of a characteristic of said exhaust gases iv) third sensing means associated with said third region for generating reference electrical signals, said third region being void of catalyst;

c) balance means receiving said first, second and third electrical signals and generating a composite signal indicative of at least one specific, gaseous component of said exhaust gases passing over said sensor;

d) computer means in said vehicle for analyzing said composite signal to determine if said vehicle complies with emission regulatory standards; and e) a warning detector in said vehicle activated by said computer means if the emissions detected by said sensor exceed emission regulatory standards.

2. The system of claim 1 further including said sensor having additional regions thereon in excess of said three regions, each additional region having a specific catalyst applied thereto for reacting with specific components of said exhaust gases and additional sensing means associated with each additional region for generating electrical signals indicative of the specific exhaust gas component reacting with said catalyst; said balance means generating a plurality of different composite signals, each of said different signals indicative of a specific polluting gas, the emissions of which is controlled by a regulatory standard.

3. The system of claim 1 wherein said gaseous components sensed by said sensor are hydrocarbons, HC.

4. The system of claim 3 wherein said sensing means are resistance type measuring devices.

5. The system of claim 4 wherein said resistance type measuring device is a thermometer.

6. The system of claim 5 further including said sensor having heating means for maintaining the temperature of said exhaust gases at said regions at a reaction temperature.

7. The system of claim 6 wherein said first and second catalysts are different oxidation catalysts.

8. The system of claim 7 wherein said first catalyst has a composition effective to cause oxidation of substantially all combustible gases in said exhaust gas at reaction temperatures including CO, $H_2$, and HC, said first sensing means generating said first electrical signals indicative of the presence of substantially all said exhaust gas combustibles and said second catalyst has a composition effective to cause oxidation principally of CO and $H_2$ and substantially ineffective to cause oxidation of HC, said second sensing means generating said second electrical signals indicative of the presence of said CO and said $H_2$ in said exhaust gases; and said balance means effective to cause the subtraction of said second signal from said first signal to produce said composite signal indicative of said HC.

9. The system of claim 8 wherein said balance means is effective to generate i) a first accurate signal from said first signal by factoring said first signal with said third signal and ii) a second accurate signal from said second signal by factoring said second signal with said third signal whereby variations in said regions otherwise preventing direct comparisons between said first and second signals are eliminated.

10. The system of claim 9 wherein said balance means is a first bridge circuit for said first signal and a second bridge circuit for said second signal, each bridge circuit effective to generate an output signal V indicative of the temperature rise of said thermocouple in said sensing means in accordance with the expression:

$$V = iG\left(\Delta R_{offset} + C\Delta T_{gas} + \sum_{j=1}^{n} [\text{analyte}]_j H_j KC\right)$$

where:
i=bridge current
G=combined amplifier gain
C=Thermocouple
$\Delta R_{offset}$=Bridge imbalance at "null" temperature
$\Delta T_{gas}=T_{actual}-T_{null}$
H=Proportionality between analyte concentration and quantity of heat liberated within the catalyst
K=Serpentine temperature rise per unit heat liberated in the catalyst.

11. The system of claim 10 wherein said first accurate sensor signal is produced in accordance with the expression:

$$\Delta V_1 = V_{1,offset} + A\left(\Delta T_{gas}(C_1 - C_3) + \sum [\text{analyte}]_j H_{j,1} K_1 C_1\right)$$

and said second accurate signal is produced in accordance with the expression:

$$\Delta V_2 = V_{2,offset} + A\ (\Delta T_{gas}(C_2-C_3)+[CO]H_{CO,1}K_2C_2)$$

where:
the subscripts refer respectively to the word designations to which they relate; and
A is the Area of said region.

12. The system of claim 10 wherein said balance means further includes a bridge circuit for a third thermometer.

13. The system of claim 10 wherein said first bridge circuit has a leg indicative of the resistance of a first thermometer and said second bridge circuit has a leg indicative of the resistance of a second thermometer.

14. The system of claim 13 wherein each bridge circuit has a leg indicative of the resistance of said third thermometer.

15. The system of claim 10 further including stored means for correcting said signals for CO gas content with stored values after said sensor has been calibrated with a CO gas.

16. The system of claim 10 wherein said balance means has summing means for subtracting said first actual signal from said second actual signal to produce said composite signal.

17. The system of claim 16 wherein said catalytic converter includes a three way catalyst capable of sensing HC, carbon monoxide and NOX carried on a ceramic or metal honeycomb substrate.

18. The system of claim 17 wherein said catalyst includes one or more precious metals selected from the group consisting of platinum, palladium, rhodium, ruthenium and iridium located on a support compound in turn affixed to said substrate.

19. The system of claim 18 wherein said catalyst further includes an oxygen storage composition.

20. The system of claim 19 wherein said catalyst contains two or more layers of precious metals and said support compound includes at least alumina.

21. The system of claim 8 wherein said first catalyst includes one or more precious metals selected from the group consisting of platinum, palladium, rhodium, ruthenium and iridium located on a refractory support.

22. The system of claim 21 wherein said second catalyst includes a rhodium component and a bismuth component located on a refractory support.

23. The system of claim 22 further including at least one operating condition sensor for sensing a vehicle operating condition, said operating condition sensor generating operating condition signals read by said computer means, said computer means effective to discard said composite signal unless and until said operating condition signals equal a set value.

24. The system of claim 23 wherein said computer means is effective to control the operation of said vehicle's engine in accordance with the value assigned to said composite signals.

25. In an on-board monitoring system detecting gaseous emissions present in exhaust gases of a vehicle's internal combustion engine, the improvement comprising:

a sensor for detecting from a continuous slipstream of said exhaust gasses passing through said sensor only the presence of hydrocarbons in said exhaust gases, said sensor having
  i) a first region containing a first catalyst promoting reactions with a first portion of said exhaust gases in said slipstream that contact said first region to cause oxidation of substantially all combustibles in exhaust gases that continuously contact said first region;
  ii) a second region containing a second catalyst promoting reactions with a second portion of said exhaust gases in said slipstream that contact said second region to cause oxidation of substantially all CO and $H_2$ in exhaust gases that continuously contact said second region;
  iii) a third region having no catalyst affixed thereto over which a third portion of said exhaust gases in said slipstream pass;
  iv) a first thermometer sensing the temperature of said first region, a second thermometer sensing the temperature of said second region and a third thermometer sensing the temperature of said third region; and
  v) balance means receiving signals from said first, second and third thermometers and generating a composite signal indicative of substantially only the HC in said exhaust gases.

26. The improvement of claim 25 wherein said balance means is effective to generate i) a first accurate signal from said first signal by factoring said first signal with said third signal and ii) a second accurate signal from said second signal by factoring said second signal with said third signal whereby variations in said regions otherwise preventing direct comparisons between said first and second signals are eliminated.

27. The improvement of claim 26 wherein said balance means has summing means for subtracting said first actual signal from said second actual signal to produce said composite signal.

28. The improvement of claim 27 further including said sensor having heating means for maintaining the temperature of said exhaust gases at said regions at a reaction temperature.

29. The improvement of claim 28 wherein said first catalyst includes one or more precious metals selected from the group consisting of platinum, palladium, rhodium, ruthenium and iridium located on a refractory support.

30. The improvement of claim 29 wherein said second catalyst includes a rhodium component and a bismuth component located on a refractory support.

* * * * *